Feb. 2, 1926.
C. J. WHITACRE
1,571,355
FRAME AND SPRING SUSPENSION FOR MOTOR VEHICLES
Filed Oct. 11, 1923
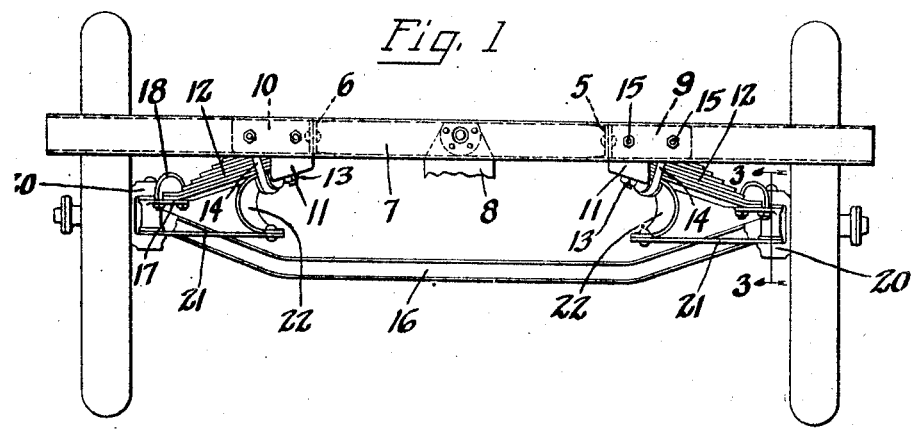
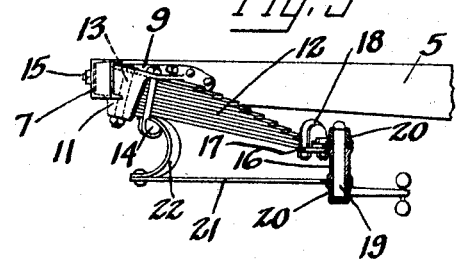
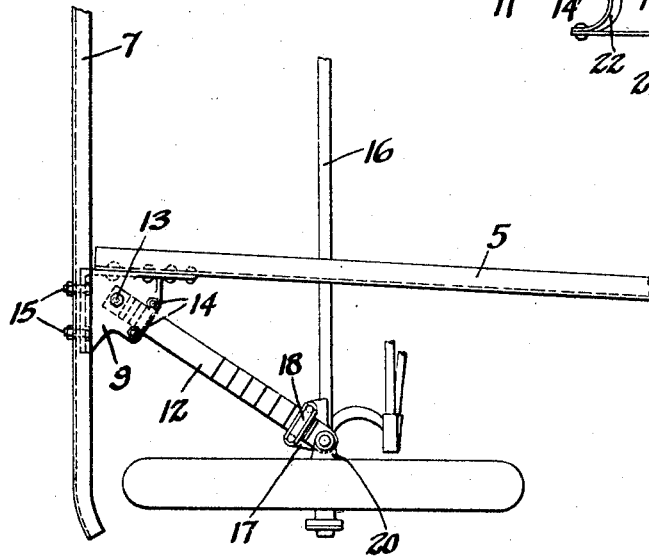
Inventor
Clarence J. Whitacre
By his Attorneys
Blackmore, Spencer & Flint Patented Feb. 2, 1926.

1,571,355

UNITED STATES PATENT OFFICE.

CLARENCE J. WHITACRE, OF DETROIT, MICHIGAN, ASSIGNOR TO GENERAL MOTORS CORPORATION, OF DETROIT, MICHIGAN, A CORPORATION OF DELAWARE.

FRAME AND SPRING SUSPENSION FOR MOTOR VEHICLES.

Application filed October 11, 1923. Serial No. 667,954.

*To all whom it may concern:*

Be it known that I, CLARENCE J. WHITACRE, a citizen of the United States, and a resident of Detroit, county of Wayne, and State of Michigan, have invented certain new and useful Improvements in Frames and Spring Suspensions for Motor Vehicles, of which the following is a full, clear, concise, and exact description, such as will enable others skilled in the art to which the invention relates to make and use the same, reference being made therein to the accompanying drawings, which form a part of this specification.

My invention relates to automobiles, motor driven trucks and similar self-propelled vehicles; and particularly to certain features of the front end of the frame, and of the front springs, of such vehicles.

The principal objects of my invention are to provide a motor driven vehicle frame wherein a transversely extending frame member or bar located adjacent the front of the vehicle performs the three functions of connecting the front ends of longitudinally extending side frame bars of the frame structure together, of acting as a support for the front end of the engine which drives the vehicle, and of serving as a fender or bumper for the front end of the vehicle; and to provide an improved front axle and spring suspension construction and arrangement whereby and wherein the vertical forces due to the load carried by the vehicle are transmitted through the springs directly to the usual steering knuckles; and caused to act vertically along lines corresponding, substantially, with the axes about which the steering knuckles oscillate; as distinguished from transmitted first directly to the front axle, and therefrom to the steering knuckles through their supporting pivots, as has heretofore commonly been the case. Such a spring construction and arrangement avoids the transmission of bending stresses of any appreciable magnitude to and through the pivot bearings about which the steering knuckles oscillate, and permits a much lighter front axle to be used than heretofore; as the same acts for the most part merely as a tie rod to hold the parts in proper relation to one another and is subjected to substantially no bending strains when the vehicle is in use.

With the above and other objects of invention in view my invention consists in the improved frame and spring construction, arrangement and features illustrated in the accompanying drawing and hereinafter described and explained; and in such variations and modifications thereof, within the scope of the concluding claims, as will be obvious to those skilled in the art to which my invention relates.

Referring now to the drawing accompanying and forming a part of this specification, and wherein the preferred embodiment of my invention is illustrated:

Figure 1 is a view showing the elements and features of a motor driven vehicle involved in my invention, and to which the same relates, in elevation and as seen from a position in front of the vehicle;

Figure 2 is a fragmentary view showing the elements upon the right hand side of Figure 1, in plan;

Figure 3 is a view showing the right hand steering knuckle and corresponding end of the front axle in section upon a vertical plane indicated by the line 3, 3, Figure 1, together with the corresponding front spring and elements and features associated therewith.

In the drawing, the reference numerals 5, 6 designate two longitudinally extending side members of the main frame of a motor driven vehicle; and 7 a transversely extending member which serves to connect the front ends of the side members together, and serves also to support the front end of the engine which drives the vehicle; the immediate motor supporting member being preferably in the form of a separate centrally located bracket indicated conventionally by the numeral 8, so that a piece of channel iron of standard form purchasable in the open market may be used in making said transverse member. Said cross bar extends laterally beyond the front ends of the side bars, and the ends thereof extend in front of the front wheels of the vehicle, as shown; so that one single transverse member forms a cross bar of the frame, a support for the front end of the engine, and a bumper for the front end of the vehicle.

Said member 7 is secured to the side bars 5, 6 through and by means of right angular spring supporting brackets 9, 10 secured to the outsides of the front ends of said bars, said brackets having hollow housings 11 upon their under sides into which the front ends of the front springs 12 extend, and within which said front ends are fastened in any way, as by means of bolts 13 extending through the extremities of the springs and U-shaped clips 14 extending about said ends; said springs being of the type or class commonly referred to as "quarter elliptic" springs, as will be appreciated. One side of each bracket is secured to the front end of a side frame member in any way, as by rivets as shown, while the said bar 7 is secured to the other sides of said brackets, preferably by bolts 15, in such a way as to be easily separable from said brackets and removable from the frame structure; from which it follows that said bumper, cross bar and engine support may be readily removed to gain access to the engine, and the engine itself removed by moving it forward through the then open front end of the frame of the vehicle.

The springs 12 diverge as they extend rearward from the brackets 9, 10 whereby their forward ends are supported; and the rear ends of these springs are so associated with the steering knuckles of the front wheels of the vehicle that the load borne by the springs is transmitted directly to and acts downward along lines lying much closer to the front wheels than has heretofore commonly been the case. In the form of my invention illustrated the rear ends of the bottom leaves of the springs rest upon plates 17 at the ends of the front axle 16 of the vehicle, and are secured to said plates by U-shaped clamps 18 acting through bearing blocks resting upon the upper surfaces of the said lower leaves at their ends; and said rear ends have holes through which the pivot bearings 19 which connect the two arms of the usual bifurcated steering knuckles 20 extend. The knuckle joint bearings or spindles 19 extend through bearings provided at the ends of the front axle and they are more securely held in their substantially vertical positions by links 21 spaced apart from and located beneath the springs 12, and the rear ends of which lie beneath the ends of the axle 16, as shown, and have holes through which said bearings extend; the front ends of said links being secured to depending arms 22 formed, preferably, from resilient material similar to that of the leaves of the springs, to thereby provide substantially fixed but at the same time yieldable supports or anchorages for the front ends of said links. The supports or arms 22 are preferably curved, as shown, and their fixed ends held in the housings 11 beneath the front ends of the springs 12, as will be understood from the drawing.

In view of the premises it will be appreciated that the load borne by the front springs is transmitted to the ends thereof and directly to the steering knuckles, and acts vertically or substantially so along the axes about which the steering knuckles turn in steering the vehicle. This permits the use of a much lighter front axle than has heretofore commonly been the case, as the same is not called upon to support the load to any considerable extent and to transmit the forces incident thereto to the wheels through the steering knuckle bearings; the load being in effect transmitted to and applied directly to the steering knuckles and the front axle acting for the most part substantially as a tie rod to maintain the parts in proper position relative to one another. The links 21 act, as will be understood, to relieve the front axle from bending and twisting strains due both to the load upon the vehicle and to shocks when the front wheels hit obstructions in the road; thus permitting the cross section of the front axle to be further reduced, and the same to act more nearly as a tie rod performing the single function of keeping the parts properly spaced relative to one another.

Having thus described and explained my invention, I claim and desire to secure by Letters Patent:

1. In a motor driven vehicle, a suitable frame; two quarter elliptic springs the front ends of which are fixedly secured to said frame adjacent the front end thereof, and which springs extend rearward and outward from their points of support; steering knuckles associated with the front wheels of the vehicle for steering the same; and means whereby the load borne by said springs is transmitted through their free rear ends directly to said steering knuckles.

2. In a motor driven vehicle, a suitable frame; two quarter elliptic springs the front ends of which are fixedly secured to said frame adjacent the front end thereof, and which springs extend from their points of support rearward and outward, and have holes at their extremities; bifurcated steering knuckles associated with the front wheels of the vehicle for steering the same; substantially vertical bearing pivots extending between the arms of said steering knuckles, and through the holes aforesaid in the rear ends of said springs; and a front axle the ends of which lie between the arms of said steering knuckles, and have bearings through which said bearing pivots extend.

3. In a motor driven vehicle, a suitable frame; two quarter elliptic springs the front ends of which are fixedly secured to said frame adjacent the front end thereof, and which springs extend from their points of support rearward and outward, and have holes at their extremities; bifurcated steering knuckles associated with the front wheels of the vehicle for steering the same; substantially vertical bearing pivots extending between the arms of said steering knuckles, and through the holes aforesaid in the rear ends of said springs; a front axle the ends of which lie between the arms of said steering knuckles, and have bearings through which said bearing pivots extend; and links the front ends of which are fixedly supported, and the rear ends of which are connected with said steering knuckles to assist in holding the same in subtsantially vertical positions.

4. In a motor driven vehicle, a suitable frame; two quarter elliptic springs the front ends of which are fixedly secured to said frame adjacent the front end thereof, and which springs extend from their points of support rearward and outward, and have holes at their extremities; bifurcated steering knuckles associated with the front wheels of the vehicle for steering the same; substantially vertical bearing pivots extending between the arms of said steering knuckles, and through the holes aforesaid in the rear ends of said springs; a front axle the ends of which lie between the arms of said steering knuckles, and have bearings through which said bearing pivots extend; arms depending from the front ends of said springs; and links arranged beneath said springs and extending along the same, the front ends of said links being secured to the extremities of said arms and the rear ends thereof to said steering knuckles to assist in holding them in substantially vertical positions.

5. In a motor driven vehicle, two longitudinally extending side frame members; a transversely extending member connecting the front ends of said side members and extending laterally beyond said ends; brackets arranged within the angles between the front ends of said side frame members and the laterally extending ends of said transverse member and upon the outer sides of said side members, and whereby said longitudinal and transverse members are held together; and springs the front ends of which are secured to said brackets and which springs extend rearward and outward from said brackets; steering knuckles associated with the front wheels of the vehicle for steering the same; and means whereby downward forces due to the load upon the vehicle are transmitted through said springs directly to said steering knuckles in substantially vertical directions.

In testimony whereof I affix my signature.

CLARENCE J. WHITACRE.